United States Patent [19]

Taniura

[11] Patent Number: 4,925,271
[45] Date of Patent: May 15, 1990

[54] OPTICAL BEAM SPLITTER

[75] Inventor: Hiroshi Taniura, Ibaragi, Japan

[73] Assignee: Think Laboratory Co., Ltd., Chiba, Japan

[21] Appl. No.: 286,364

[22] Filed: Dec. 16, 1988

[30] Foreign Application Priority Data

May 16, 1988 [JP] Japan .................................. 63-120169

[51] Int. Cl.$^5$ ............................................. G02B 27/14
[52] U.S. Cl. ..................................... 350/172; 350/171
[58] Field of Search ...................... 350/171, 172; 354/4

[56] References Cited

U.S. PATENT DOCUMENTS

| | | | |
|---|---|---|---|
| 4,362,361 | 12/1982 | Campbell et al. | 350/171 |
| 4,701,012 | 10/1987 | Kaiser | 350/96.19 |
| 4,765,715 | 8/1988 | Matsudaria et al. | 350/171 |
| 4,797,696 | 1/1989 | Allen et al. | 354/4 |

*Primary Examiner*—Bruce Y. Arnold
*Assistant Examiner*—Vincent A. Frouhar
*Attorney, Agent, or Firm*—Koda & Androlia

[57] ABSTRACT

An optical beam splitter including a prescribed number of stacked transparent parallel plates whose thicknesses are uniform to a high degree of precision, the back surface of the transparent parallel plate which is the farthest from the side at which light beam that is to be split enters is coated with a totally reflective film, while the back surfaces of all of the remaining transparent parallel plates are coated with different semi-reflective film whose respective reflectivities gradually increase and the coating region of the totally reflective film and semi-reflective films are positioned in an oblique arrangement which is struck by the light beam traveling obliquely through the interiors of the transparent parallel plates. With this optical beam splitter, the incident light beam is converted into a number of split light beams which are of equal luminous intensity by partial reflection by the respective semi-reflective films and total reflection by the totally reflective film, and the respective split light beams are emitted parallel to each other in a row in the direction of the side of the stack from which the incident light beam initially entered without any of the split light beams striking the preceding semi-reflective films.

1 Claim, 1 Drawing Sheet

OPTICAL BEAM SPLITTER

BACKGROUND OF THE INVENTION

1. Field of the Invention

The present invention concerns an optical beam splitter which is necessary in cases where, for example, halftone plate duplicate images are recorded on a recording material by controlling a light-exposure means on the recording side in accordance with image signals obtained by the photoelectric manipulation of an original image, and especially in cases where halftone plate images are recorded by independently modulating a multiple number of beams on the basis of image signals. The present invention also concerns an optical beam splitter which can be used for the optical beam splitting required in cases where halftone images are cut into plastic by means of a laser working device.

2. Prior Art

The recording of halftone plate images by the relative scanning of a multiple number of light beams (lined up in a row) across the surface of a recording material, with the light beams being independently modulated on the basis of image signals, has been conventionally known in the art. In most cases, the multiple number of light beams are obtained by installing a multiple number of totally reflective mirrors and semi-reflective mirrors, and splitting a single light beam enerated by an argon laser by reflecting the light beam from the mirrors. The respective light beams thus obtained are independently modulated by a multi-channel ultrasonic modulator and are then reduced in diameter by a crystal optical system and directed onto the surface of a recording material.

Inventions, which use a single optical beam splitter, and in which a single light beam is split into a multiple number of light beams (lined up in a row) by repeated internal reflection in this optical beam splitter, are described in Japanese Patent Application Laid-Open (Kokai) No. 52-122135 and Japanese Patent Application Laid-Open (Kokai) No. 58-10713. In both of these inventions, one surface of a single glass plate is coated with a totally reflective film, while the other surface is coated in different regions with semi-reflective films having different reflectivities. To describe the semi-reflective films in detail, e. g. in a case where a single light beam is split into ten (10) light beams, the first region is coated with a semi-reflective film which has a reflectivity of 9/10 (i. e., a transmissivity of 1/10). The next region is coated with a semi-reflective film which has a reflectivity of 8/9 (i. e., a transmissivity of 1/9), and the next region after this is coated with a semi-reflective film which has a reflectivity of ⅞ (i. e., a transmissivity of ⅛). In this way, successive regions are coated with semi-reflective films whose reflectivities gradually decrease in a numerical series, so that the last region is coated with a semi-reflective film which has a reflectivity of ½ (i. e., a transmissivity of ½).

However, if a single laser beam generated by an argon laser is converted into a multiple number of laser beams by the installation of mirrors or optical fibers, the apparatus requires a large amount of space. Furthermore, adjustment of the mirrors or optical fibers requires a high degree of technical skill and a great amount of time. Accordingly, such techniques involve considerable trouble.

On the other hand, the abovementioned defects are completely eliminated by the optical beam splitters described in Japanese Patent Application Laid-Open (Kokai) No. 58-10713 and Japanese Patent Application Laid-Open (Kokai) No. 52-122135.

In both of these optical beam splitters, however, the splitting of a single light beam into 10 light beams requires an arrangement in which nine regions with an extremely narrow width of 2 mm or less are coated with semi-reflective films whose reflectivities vary according to the region as described above. Since the failure of even one coating is impermissible, very difficult techniques are required.

The optical beam splitter described in Japanese Patent Application Laid-Open (Kokai) No. 52-122135 is advantageous in that an increase in the number of split light beams does not require any increase in the size of the crystal optical system. However, since the split light beams are not parallel to each other, the modulating efficiency of the modulator drops, and light leakage may occur. Furthermore, formation of the acoustic electrodes of the modulator is also difficult. In addition, maintaining the thickness and angle of intersection of the two surfaces of the optical beam splitter at prescribed values with an ultra-high degree of precision is difficult, and the manufacture of the optical beam splitter involves great difficulty. If the thickness or angle of intersection of the two surfaces of the optical beam splitter shows even a slight variation, the focal distances of the respective light beams will show a large variation, and the spacing between the optical beam splitter and the modulator, as well as the spacing between the modulator and a "crystal optical system modulator," will be unavoidably different in each individual apparatus.

SUMMARY OF THE INVENTION

The object of the present invention is to provide an optical beam splitter in which the semi-reflective films can be made respectively larger, so that the formation of semi-reflective films with accurate reflectivities is facilitated.

Another object of the present invention is to provide an optical beam splitter which can split a beam in such a way that equal quantities of light are obtained, without any need for a large installation space.

The optical beam splitter of the present invention is characterized in that a prescribed number n of transparent parallel plates, for example, $P_1, P_2, P_3, \ldots P_{n-1}, P_n$, whose thicknesses are uniform to a high degree of precision, are stacked together and the back surface of the transparent parallel plate $P_n$ which is the farthest from the side at which the light beam enters is coated with a totally reflective film, while the back surfaces of all of the remaining transparent parallel plates $P_1, P_2, P_3, \ldots P_{n-1}$ are coated with different semi-reflective films whose respective reflectivities gradually increase from the front of the stack toward the back in a numerical series $1/n, 1/(n-1), 1/(n-2), 1/(n-3), \ldots \frac{1}{4}, \frac{1}{3}, \frac{1}{2}$ in relation to the number n of the transparent parallel plates. The coating regions of the totally reflective film and semi-reflective films are positioned in an oblique arrangement which is struck by the light beam traveling obliquely through the interiors of the transparent parallel plates. The optical beam splitter is designed so that the light beam is converted into a number n of split light beams which are of equal luminous intensity (the number n of the split light beams is equal to the number n of the transparent parallel plates) by a partial reflection by the respective semi-reflective films and total reflection by the totally reflective film. The optical beam splitter is also designed so that the respective split light beams are emitted parallel to each other in a row in the direction of the side of the stack from which the incident light beam initially entered, without any of the split light beams striking the preceding semi-reflective films.

DETAILED DESCRIPTION OF THE INVENTION

Figure 1A:
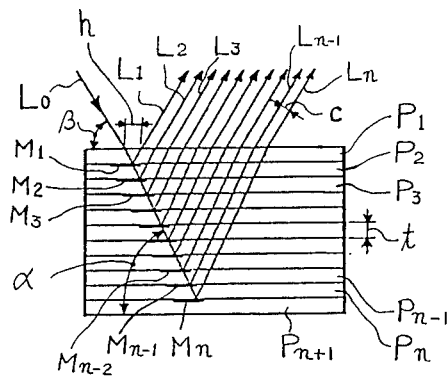
FIG. 1(a) is a side view of a first embodiment of the optical beam splitter of the present invention.
Figure 1B:
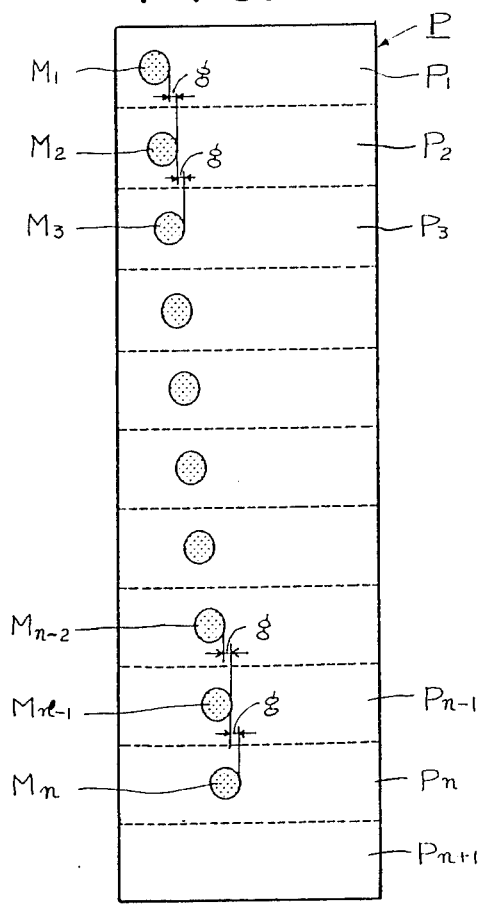
FIG. 1(b) is a bottom view of a multi-coating plate which is used to manufacture the optical beam splitter of FIG. 1(a)

The optical beam splitter of FIG. 1(a) shows a first embodiment of the present invention having transparent plates P1, P2, P3, ... Pn−1, Pn, Pn+1. These n+1 transparent parallel plates P1, P2, P3, ... Pn−1, Pn, Pn+1 are formed by splitting a single transparent parallel plate P into n+1 plates as shown in FIG. 1(b). Accordingly, the thicknesses of the transparent parallel plates are uniform to a high degree of precision.

Semi-reflective films M1, M2, M3, ... Mn−2, Mn−1 and totally reflective film Mn are applied to the substrate P before it is split into n+1 plates. In this embodiment, the number of the semi-reflective films M1 through Mn−1 is nine, and the semi-reflective film M1 has a reflectivity of 1/10 (i. e., a transmissivity of 9/10), the semi-reflective film M2 has a reflectivity of 1/9 (i. e., a transmissivity of 8/9), the semi-reflective film 3 has a reflectivity of ⅛ (i. e., a transmissivity of ⅞) and so on, so that the semi-reflective film Mn-2 has a reflectivity of ⅓ (i. e., a transmissivity of ⅔) and the semi-reflective film Mn−1 has a reflectivity of ½ (i. e., a transmissivity of ½). Accordingly, each of the n split light beams L1, L2, L3, ... Ln−1, Ln shown in FIG. 1(a) has a quantity of light equal to 1 of n equal parts of the light beam L0.

The semi-reflective films Ml through Mn are formed as circular films whose diameters are at least larger than the beam diameter of the light beam L0. The semi-reflective film M1 and the semi-reflective film M2 are shifted relative to each other by a small distance g, as are the semi-reflective film M2 and the semi-reflective film M3, and so on up to the semi-reflective film Mn−2 and the semi-reflective film Mn−1, and the semi-reflective film Mn−1 and the totally reflective film Mn. This small distance g is ½ of the small distance h shown in FIG. 1(a).

The reason for the above arrangement is as follows: i. e., when the transparent parallel plate P is split along the dotted lines, and the resulting plates are stacked as shown in FIG. 1(a), this arrangement insures that the split light beams L2, L3, ... Ln−1, Ln formed by internal reflection of the light beam L0 by the respective reflective films M2, M3, ... Mn−2, Mn−1, Mn will be emitted parallel to each other in the direction of the side of the stack from which the light beam L0 initially entered, without any of the split light beams striking the respective preceding semi-reflective films M1, M2, M3, ... Mn−2, Mn−1. The small distance h shown in FIG. 1(a) is determined by the angle of incidence α at which the light beam L0 travels through the transparent parallel plates, and the thickness t of the transparent parallel plates. Specifically, h=2t÷tan α.

Furthermore, the angle α at which the light beam L0 travels through the transparent parallel plates is determined by the angle of incidence β of the light beam L0 and the refractive index of the transparent parallel plate P.

Accordingly, the spacing c of the split light beams is determined by the angle of incidence β of the light beam L0, the refractive index of the transparent parallel plate P, and the thickness t of the transparent parallel plate P. Furthermore, if the spacing c, the angle of incidence β of the light beam L0 and the material of the transparent parallel plate P are determined, then the thickness t of the transparent parallel plate P can be determined, along with the small distance g shown in FIG. 1(b), so that all of the conditions for the manufacture of the multi-coating plate shown in FIG. 1(b) are set.

Furthermore, the totally reflective film Mn may be formed by coating the entire surface of the Pn portion of the transparent parallel plate P.

It is desirable that the transparent parallel plate Pn+1 be added to the stack in order to protect the totally reflective film Mn. If this is done, then all of the reflective films M1 through Mn will be positioned at the internal stacking interfaces. If the front surface of the transparent parallel plate P1 or the back surface of the transparent parallel plate Pn+1 is contaminated during handling, the surfaces can be wiped clean.

Figure 2A:
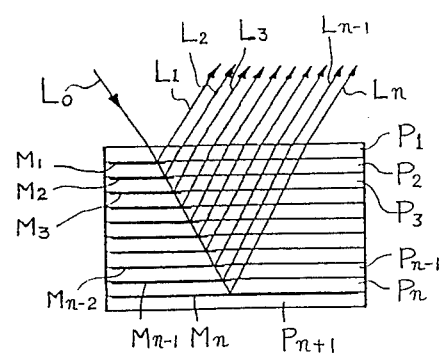
FIG. 2(a) is a side view of a second embodiment of the optical beam splitter of the present invention.
Figure 2B:
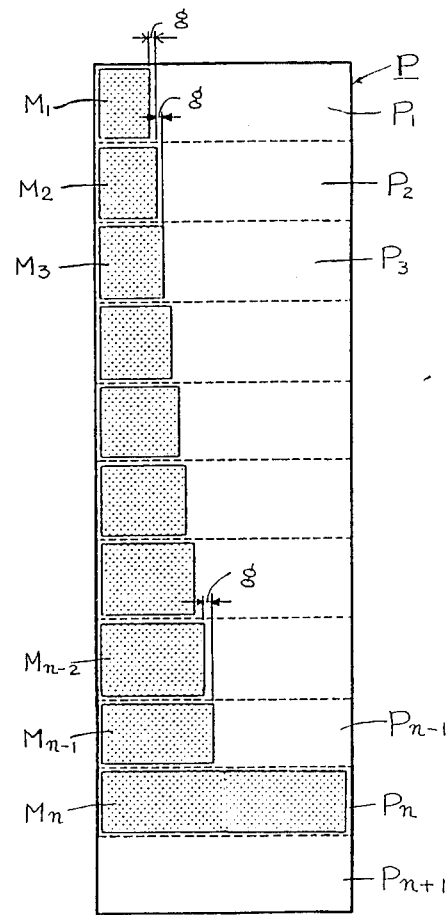
FIG. 2(b) is a bottom view of a multi-coating plate which is used to manufacture the optical beam splitter of FIG. 2(a).

In the optical beam splitter shown in FIG. 2(a), which is a second embodiment of the present invention, the semi-reflective films M1, M2, M3, ... Mn−1 and the totally reflective film Mn differ from those in the first embodiment as shown in FIG. 2(b). In this embodiment, the semi-reflective films M1 through Mn−1 are formed as rectangular films. Furthermore, as in the first embodiment, the semi-reflective film Ml and the semi-reflective film M2 are shifted relative to each other by small distance g, as are the semi-reflective film M2 and the semi-reflective film M3, and so on up to the semi-reflective film Mn−2 and the semi-reflective film Mn−1. In the case of the totally reflective film Mn, almost the entire surface of the Pn portion of the transparent parallel plate P is coated.

As described above, the optical beam splitter of the present invention possesses the following merits:

1. Beam splitting can be performed so that the respective quantities of light obtained are equal.
2. The semi-reflective films can be made respectively larger, so that the formation of semi reflective films with accurate reflectivities is facilitated.
3. A large installation space is not required.

I claim:

1. An optical beam splitter characterized in that a prescribed number of transparent parallel plates, whose thicknesses are uniform to a high degree of precision, are stacked together, and the back surface of the transparent parallel plate which is the farthest from the side at which a light beam enters is coated with a totally reflective film, while the back surfaces of all of the remaining transparent parallel plates are coated with different semi-reflective films whose respective reflectivities gradually increase in the direction of the entering beam, the coating regions of said totally reflective film and semi-reflective films being positioned in an oblique arrangement which is struck by said light beam traveling obliquely through the interiors of said transparent parallel plates, said optical beam splitter being designed so that said incident light beam is converted into a number of split light beams which are of equal luminous intensity, said number of split light beams being equal to the number of said transparent parallel plates, by partial reflection by the respective semi-reflective films and totally reflection by said totally reflective film, and that the respective split light beams are emitted parallel to each other in a row in the direction of the side of the stack from which said incident light beam initially entered without any of said split light beams striking the preceding semi-reflective films.

* * * * *